United States Patent
Patel

(10) Patent No.: US 9,509,542 B1
(45) Date of Patent: Nov. 29, 2016

(54) METHOD AND APPARATUS FOR CHANNEL ESTIMATION TOLERANT TO TIMING ERRORS

(71) Applicant: MBIT WIRELESS, INC., Newport Beach, CA (US)

(72) Inventor: Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 14/962,581

(22) Filed: Dec. 8, 2015

(51) Int. Cl.
*H04L 27/26* (2006.01)
*H04W 72/04* (2009.01)

(52) U.S. Cl.
CPC ....... *H04L 27/2646* (2013.01); *H04L 27/2611* (2013.01); *H04L 27/2665* (2013.01); *H04W 72/0446* (2013.01)

(58) Field of Classification Search
CPC ........... H04L 27/2611; H04L 27/2618; H04L 27/262; H04L 27/2621; H04L 27/2646; H04L 27/265; H04L 27/2663; H04L 27/2665; H04L 27/2666; H04W 72/0446
USPC ......... 375/259–262, 265, 267, 347; 370/208, 370/210
See application file for complete search history.

(56) References Cited

U.S. PATENT DOCUMENTS

| 6,853,616 B1* | 2/2005 | Kim ..................... H04L 27/2665 370/210 |
| 6,928,048 B1* | 8/2005 | Do ....................... H04L 27/2666 370/208 |
| 2008/0069252 A1* | 3/2008 | Wenzhen ............ H04L 27/2657 375/260 |
| 2008/0101488 A1 | 5/2008 | Wilhelmsson et al. |
| 2011/0002403 A1* | 1/2011 | Wilhelmsson ........ H04L 5/0007 375/260 |
| 2015/0139190 A1 | 5/2015 | Patel et al. |

OTHER PUBLICATIONS

Proakis, John G. et al., "Digital Communications" (2007) 12:35 Fifth Edition.

* cited by examiner

*Primary Examiner* — Young T Tse
(74) *Attorney, Agent, or Firm* — Lerner, David, Littenberg, Krumholz & Mentlik, LLP

(57) ABSTRACT

Channel estimation is essential in a receiver for many communication systems. In OFDM systems the channel estimation is often performed in frequency domain. Typically an FFT is used to convert a time domain signal into frequency domain signal. The sample position at which the first sample for the FFT is selected depends on the estimated timing position of the OFDM symbol boundary. Any error in the timing position estimate for the OFDM symbol boundary causes linear phase distortion in frequency domain. The linear phase distortion in frequency domain degrades the quality of channel estimation which may be performed in frequency domain. A method and apparatus are disclosed that estimate the FFT window position errors and compensate for the FFT window position error for improved channel estimation.

24 Claims, 12 Drawing Sheets

METHOD AND APPARATUS FOR CHANNEL ESTIMATION TOLERANT TO TIMING ERRORS

BACKGROUND

Typically, as shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station with which the client terminal is communicating is referred to as the serving base station. In some wireless communication systems the serving base station is normally referred to as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred to as a neighbor cell.

Quadrature Amplitude Modulation ("QAM"), Phase Shift Keying ("PSK"), Binary PSK ("BPSK"), and Quadrature PSK ("QPSK") are some of the commonly used modulation techniques in digital communication systems. The set of all symbols and their arrangement in a modulation technique is referred to as constellation.

The reference phase and amplitude of the modulation constellation are required at the receiver to estimate the symbols sent by the transmitter. In general, the phase and amplitude of the constellation show random variations due to many channel impairments such as fading, frequency response of the channel, frequency offset, timing offset, etc. In coherent detection at the receiver, the reference phase and amplitude of the modulation constellation may be obtained from reference symbols that may be transmitted along with the data symbols. In non-coherent detection, previously detected symbols may be used as reference symbols for detecting current symbols. Coherent detection may provide superior performance than non-coherent detection. The overhead in terms of the bandwidth and power allocated for transmitting reference symbols is justified by the improved performance. The process of estimating the phase and amplitude of the channel to demodulate the received symbol is referred to as channel estimation. The process of compensating the effect of the random phase and amplitude variation by using the estimated channel conditions is referred to as equalization.

Orthogonal frequency division multiplexing (OFDM) is used in many digital communication systems. In OFDM a large number of closely spaced orthogonal subcarriers is used to transmit data as shown in FIG. 2. The data are divided into several parallel data streams one for each subcarrier. Each subcarrier is modulated with a conventional modulation scheme such as QAM, PSK, BPSK, or QPSK, at a low symbol rate while maintaining total data rate similar to single carrier modulation schemes in the same bandwidth. The frequency spacing between two adjacent subcarriers is referred to as subcarrier spacing and it is denoted by $\Delta f$. The rate at which the individual subcarriers is modulated is referred to as symbol rate. The collection of all the subcarriers is referred to as an OFDM symbol. The OFDM symbol rate is the same as the data symbol rate on each individual subcarrier. The OFDM symbol duration is denoted by $T_u$. The OFDM signal is generated in frequency domain and then converted to time domain using an inverse Fast Fourier Transform (FFT). An OFDM signal over one symbol duration is referred to as an OFDM symbol in both time domain and frequency domain.

In case of a time dispersive channel the orthogonality between the subcarriers of an OFDM signal may be lost. The reason for this loss of subcarrier orthogonality is that the OFDM symbol boundary for one path will overlap with the symbol boundary of a different path, as illustrated in FIG. 3. As a consequence, in case of a time dispersive channel there will be inter-symbol interference within a subcarrier and interference between subcarriers.

Cyclic prefix insertion is typically used in OFDM to address the loss of orthogonality in time dispersive channels and to make an OFDM signal robust to time dispersion on the radio channel. As illustrated in FIG. 3, cyclic prefix insertion is performed by copying the last portion of the OFDM symbol and inserting it at the beginning of the OFDM symbol. Cyclic prefix insertion makes an OFDM signal robust to time dispersion as long as the span of the time dispersion does not exceed the length of the cyclic prefix.

At the receiver side, the samples corresponding to cyclic prefix are discarded before FFT processing to convert the received time domain signal to frequency domain. Assuming a sufficiently large cyclic prefix, the linear convolution of a time dispersive radio channel will appear as a circular convolution during the OFDM symbol interval $T_u$. The combination of OFDM modulation (inverse FFT processing), a time dispersive radio channel, and OFDM demodulation (FFT processing) can then be seen as a frequency domain channel as illustrated in FIG. 4, where the frequency domain channel taps $h_0, \ldots, h_{N-1}$ can be directly derived from the channel impulse response, where N is the number of used subcarriers in an OFDM symbol The output $r_k$ of the $k^{th}$ subcarrier at the receiver in FIG. 4 is the transmitted modulation symbol $x_k$ scaled and phase rotated by the complex frequency domain channel tap $h_k$ and impaired by noise $n_k$. For coherent detection of the transmitted symbol, the receiver may multiply $r_k$ with the complex conjugate of the estimated channel, $\hat{h}_k$, as illustrated in FIG. 4. This is often referred to as a one tap frequency domain equalizer being applied to each received subcarrier.

To perform data demodulation, the receiver has to estimate the frequency domain channel taps $h_0, h_1, \ldots, h_{N-1}$. The frequency domain channel taps may be estimated by using known reference symbols, which may be inserted by the transmitter at regular intervals within the OFDM time-frequency grid, as illustrated in FIG. 5. Each basic element in the grid is referred herein as a Resource Element ("RE")

and the REs used for Reference Symbols ("RS") are often referred to as pilot symbols or RS REs. The subcarrier on which the pilot symbol is transmitted is referred to as a pilot subcarrier. The terms pilot, pilot subcarrier, and pilot symbol are used interchangeably herein.

After converting an OFDM symbol into a frequency domain OFDM symbol the REs corresponding to the RS are used to estimate the channel since the modulation sequence for the reference symbols is known. After estimating the channel at the RS RE position, the channel estimation for the non-RS REs is performed using existing techniques known in literature, for example, a minimum mean square error (MMSE).

It is known that the timing position of the FFT window at the receiver must align exactly with the actual OFDM symbol boundary for optimum performance. Any timing error in positioning the FFT window relative to the true OFDM symbol boundary will appear as a linear phase distortion in the frequency domain. An example of this distortion is shown in FIG. 6. An adverse effect of the timing position error for the FFT window is that the correlation that exists between the adjacent subcarriers may be altered due to the linear phase distortion. The basis for the conventional channel estimation techniques such as MMSE is the correlation between the adjacent subcarriers. If the correlation between the adjacent subcarriers is altered, the quality of the channel estimation may be diminished. In mobile wireless communication systems, as the client terminals may be mobile, their position relative to the serving cell may change continually. The change in position may lead to changes in propagation delays and the reference timing as observed by the client terminal. A method and apparatus are disclosed that enable channel estimation that is robust against the timing errors.

SUMMARY

In accordance with an aspect of the present invention, a method for channel estimation in a wireless communication system may include controlling, by a processing device, for each of a plurality of window positions for each of at least one orthogonal frequency division multiplexing (OFDM) symbol: performing a Fast Fourier Transform (FFT) at a given window position of a given OFDM symbol; determining a channel estimate for reference symbol (RS) reference elements (RE) of the given OFDM symbol for the given window position, based on a predetermined modulation sequence; and determining an average phase difference θ between two adjacent RS REs of the RS REs for the channel estimate for the given window position, by computing an angle of average correlation between the two adjacent RS REs over an entire frequency domain of the given OFDM symbol. In addition, the method may include controlling, by the processing device, determining, as an optimum window position for the channel estimation, the window position of the plurality of window positions for the given OFDM symbol for which an absolute value of the average phase difference is smallest.

In one alternative, the plurality of window positions may include three window positions.

In one alternative, the plurality of window positions may include a first window position based on an estimated timing for a boundary of the given OFDM symbol and at least one second window position advanced relative to the first window position and at least one third window position delayed relative to the first window position.

In one alternative, the channel estimate may be by Least Squares (LS) channel estimation.

In one alternative, the average phase difference φ between the two adjacent RS REs for the channel estimate for the given window position i may be computed as $$\theta_i = \angle \left( \frac{1}{N-1} \sum_{k=0}^{N-2} \hat{h}_{k,i} \hat{h}_{k+1,i}^* \right)$$

wherein the channel estimate corresponding to the given window position i is $\hat{h}_{k,i}$ for k=0 to N−1, and the superscript ( )* denotes complex conjugate.

In one alternative, the method may include controlling, by the processing device, performing channel estimation for non-RS REs of the given OFDM symbol using the channel estimate corresponding to the optimum window position.

In one alternative, the non-RS REs may include data symbol REs and the channel estimation for the non-RS REs may be performed by minimum mean square error (MMSE) estimation followed by equalization.

In one alternative, the at least one OFDM symbol may include a plurality of OFDM symbols, and the method may further include controlling, by the processing device, periodically, determining an updated optimum window position, based on the optimum window positions respectively determined for a predetermined last plurality of the plurality of OFDM symbols.

In one alternative, the at least one OFDM symbol may include a plurality of OFDM symbols, and the method may include controlling, by the processing device, when the optimum window positions for the channel estimates respectively for the plurality of OFDM symbols are the same, combining the respective channel estimates to obtain an overall channel estimate for the plurality of OFDM symbols.

In one alternative, the combining the respective channel estimates may include averaging the respective channel estimates to obtain an average channel estimate as the overall channel estimate.

In accordance with an aspect of the present invention, a method for channel estimation in a wireless communication system may include: controlling, by a processing device, for a single window position of a plurality of window positions for each of at least one orthogonal frequency division multiplexing (OFDM) symbol, performing a Fast Fourier Transform (FFT) for a given OFDM symbol; determining a channel estimate for reference symbol (RS) reference elements (RE) of the given OFDM symbol for the single window position, based on a predetermined modulation sequence; and determining an average phase difference θ between two adjacent RS REs of the RS REs for the channel estimate for the single window position of the given OFDM symbol, by computing an angle of average correlation between the two adjacent RS REs over an entire frequency domain of the given OFDM symbol. In addition, the method may include controlling, by the processing device, for each window position of the plurality of window positions other than the single window position for each of the at least one OFDM symbol, determining a linear phase shift φ between two adjacent RS REs of the RS REs corresponding to a given window position of the given OFDM symbol, and determining a phase difference δ between the average phase difference φ for the single window position of the given OFDM symbol and the linear phase shift φ corresponding to the given window position of the given OFDM symbol.

Further, the method may include controlling, by the processing device, for each of the at least one OFDM symbol, determining, as an optimum window position for the channel estimation, the window position of the plurality of windows of the given OFDM symbol for which an absolute value of the phase difference δ is smallest.

In one alternative, the average phase difference φ between the two adjacent RS REs for the channel estimate for the window position may be computed as $$\theta = \angle \left( \frac{1}{N-1} \sum_{k=0}^{N-2} \hat{h}_k \hat{h}_{k+1}^* \right)$$

wherein the channel estimate corresponding to the window position is $\hat{h}_k$ for k=0 to N−1, and the superscript ( )* denotes complex conjugate.

In one alternative, the linear phase shift phase φ may be a phase difference between two adjacent RS REs of the RS REs for the given window position of the given OFDM symbol computed as $e^{-jk\Delta f \cdot (DT_S)} e^{-jk\Delta f \cdot (DT_S)}$, where D is a number of sample offset of the given window position of the given OFDM symbol from the single window position of the given OFDM symbol, $T_s$ is duration of one sample, k is a subcarrier index, Δf is subcarrier spacing in Hertz, and j=$\sqrt{-1}$.

In one alternative, the at least one OFDM symbol may include a plurality of OFDM symbols, and the method may further include controlling, by the processing device, when the optimum window positions for the channel estimates respectively for the plurality of OFDM symbols are the same, combining the respective channel estimates to obtain an overall channel estimate for the plurality of OFDMs.

In one alternative, the combining the respective channel estimates may include averaging the respective channel estimates to obtain an average channel estimate as the overall channel estimate.

In one alternative, the single window position may be based on an estimated time for a boundary of the given OFDM symbol.

In accordance with an aspect of the present invention, an apparatus for channel estimation in a wireless communication system may include circuitry configured to control, for each of a plurality of window positions for each of at least one orthogonal frequency division multiplexing (OFDM) symbol: performing a Fast Fourier Transform (FFT) at a given window position of a given OFDM symbol; determining a channel estimate for reference symbol (RS) reference elements (RE) of the given OFDM symbol for the given window position, based on a predetermined modulation sequence; and determining an average phase difference θ between two adjacent RS REs of the RS REs for the channel estimate for the given window position, by computing an angle of average correlation between the two adjacent RS REs over an entire frequency domain of the given OFDM symbol. In addition, the circuitry may be configured to control determining, as an optimum window position for the channel estimation, the window position of the plurality of window positions for the given OFDM symbol for which an absolute value of the average phase difference is smallest.

In one alternative of the apparatus, wherein the plurality of window positions may include a first window position based on an estimated timing for a boundary of the given OFDM symbol and at least one second window position advanced relative to the first window position and at least one third window position delayed relative to the first window position.

In accordance with an aspect of the present invention, an apparatus for channel estimation in a wireless communication system may include circuitry configured to control, for a single window position of a plurality of window positions for each of at least one orthogonal frequency division multiplexing (OFDM) symbol: performing a Fast Fourier Transform (FFT) for a given OFDM symbol; determining a channel estimate for reference symbol (RS) reference elements (RE) of the given OFDM symbol for the single window position, based on a predetermined modulation sequence; and determining an average phase difference θ between two adjacent RS REs of the RS REs for the channel estimate for the single window position of the given OFDM symbol, by computing an angle of average correlation between the two adjacent RS REs over an entire frequency domain of the given OFDM symbol. In addition, the circuitry may be configured to control, for each window position of the plurality of window positions other than the single window position for each of the at least one OFDM symbol: determining a linear phase shift φ between two adjacent RS REs of the RS REs corresponding to a given window position of the given OFDM symbol, and determining a phase difference δ between the average phase difference θ for the single window position of the given OFDM symbol and the linear phase shift φ corresponding to the given window position of the given OFDM symbol. Further, the circuitry may be configured to control, for each of the at least one OFDM symbol, determining, as an optimum window position for the channel estimation, the window position of the plurality of windows of the given OFDM symbol for which an absolute value of the phase difference δ is smallest.

In one alternative of the apparatus, the single window position may be based on an estimated time for a boundary of the given OFDM symbol.

In accordance with an aspect of the present invention, a wireless communication device may include a receiver to receive an orthogonal frequency division multiplexing (OFDM) signal. The device may further include a processing device configured to control, for each of a plurality of window positions for each of at least one orthogonal frequency division multiplexing (OFDM) symbol of the signal: performing a Fast Fourier Transform (FFT) at a given window position of a given OFDM symbol; determining a channel estimate for reference symbol (RS) reference elements (RE) of the given OFDM symbol for the given window position, based on a predetermined modulation sequence; and determining an average phase difference θ between two adjacent RS REs of the RS REs for the channel estimate for the given window position, by computing an angle of average correlation between the two adjacent RS REs over an entire frequency domain of the given OFDM symbol. Also, the processing device may be configured to control determining, as an optimum window position for the channel estimation, the window position of the plurality of window positions for the given OFDM symbol for which an absolute value of the average phase difference is smallest.

In one alternative of the device, the plurality of window positions may include a first window position based on an estimated timing for a boundary of the given OFDM symbol and at least one second window position advanced relative to the first window position and at least one third window position delayed relative to the first window position.

In accordance with an aspect of the present invention, a wireless communication device may include a receiver to receive an orthogonal frequency division multiplexing (OFDM) signal. In addition, the device may include a processing device configured to control, for a single window position of a plurality of window positions for each of at least one orthogonal frequency division multiplexing (OFDM) symbol of the signal: performing a Fast Fourier Transform (FFT) for a given OFDM symbol; determining a channel estimate for reference symbol (RS) reference elements (RE) of the given OFDM symbol for the single window position, based on a predetermined modulation sequence; and determining an average phase difference θ between two adjacent RS REs of the RS REs for the channel estimate for the single window position of the given OFDM symbol, by computing an angle of average correlation between the two adjacent RS REs over an entire frequency domain of the given OFDM symbol. In addition, the processing device may be configured to control, for each window position of the plurality of window positions other than the single window position for each of the at least one OFDM symbol: determining a linear phase shift φ between two adjacent RS REs of the RS REs corresponding to a given window position of the given OFDM symbol, and determining a phase difference δ between the average phase difference θ for the single window position of the given OFDM symbol and the linear phase shift φ corresponding to the given window position of the given OFDM symbol. Further, the processing device may be configured to control, for each of the at least one OFDM symbol, determining, as an optimum window position for the channel estimation, the window position of the plurality of windows of the given OFDM symbol for which an absolute value of the phase difference δ is smallest.

In one alternative of the device, the single window position may be based on an estimated time for a boundary of the given OFDM symbol.

DETAILED DESCRIPTION

Figure 1:
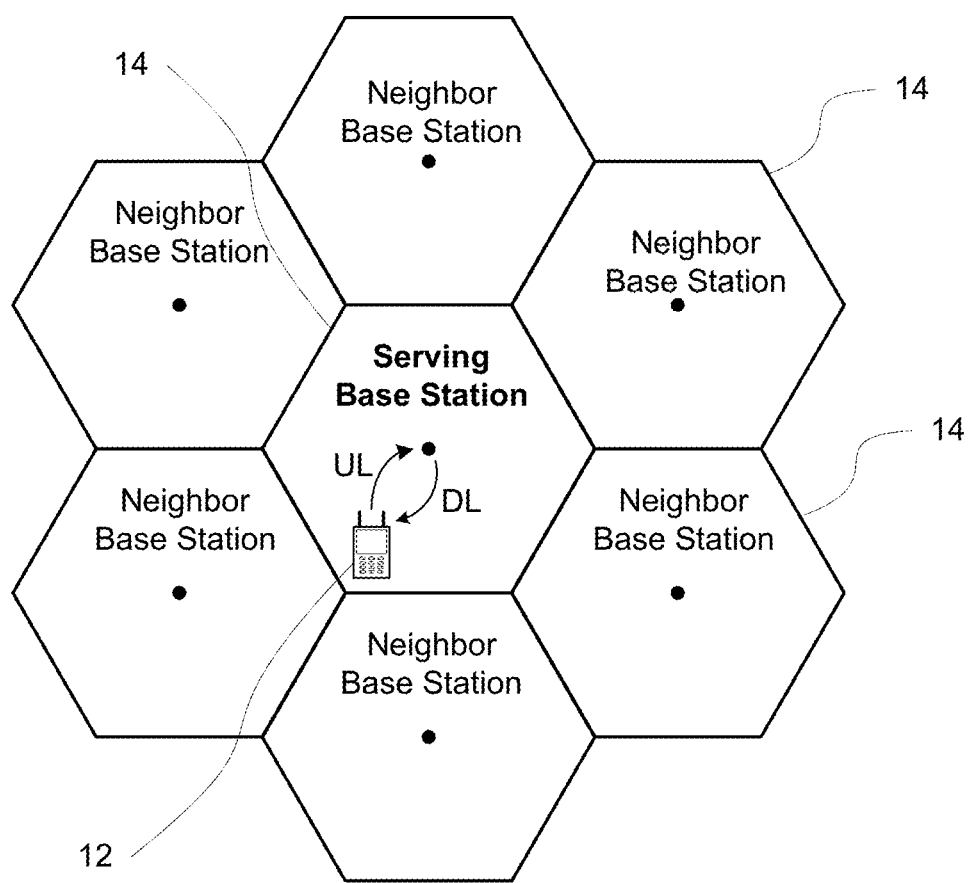
FIG. 1 illustrates a conventional wireless cellular communication system.
Figure 2:
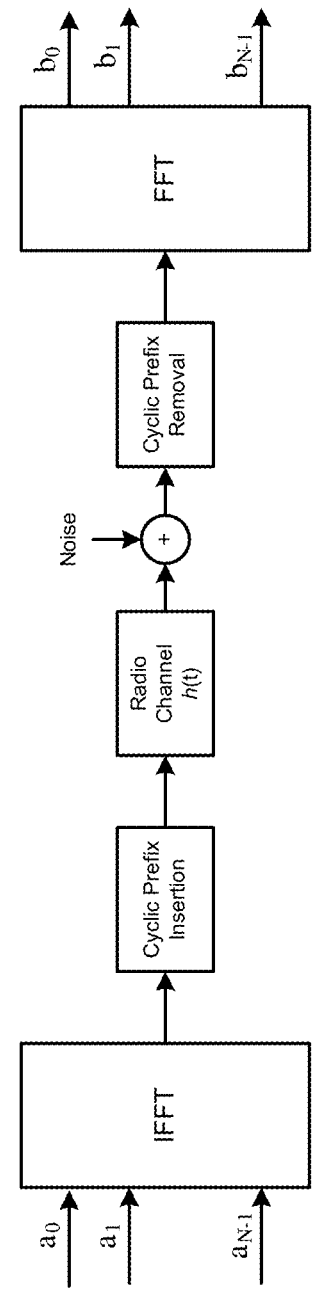
FIG. 2 illustrates a block diagram of an OFDM wireless communication system.
Figure 3:
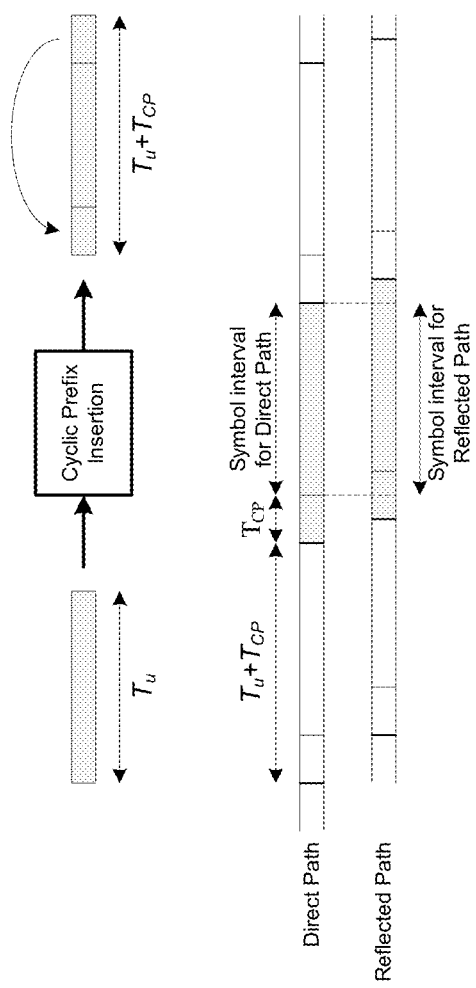
FIG. 3 illustrates the cyclic prefix insertion and the handling of multipath dispersive channel by the cyclic prefix.
Figure 4:
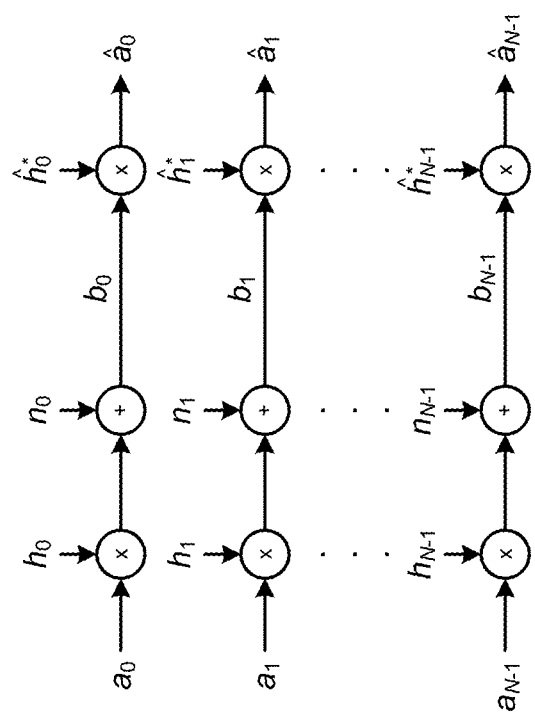
FIG. 4 illustrates an equivalent frequency domain channel and its equalization for an OFDM wireless communication system.
Figure 5:
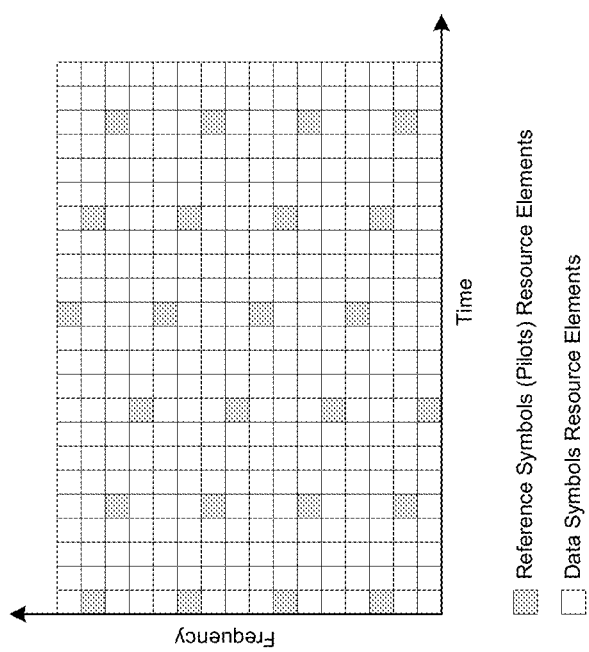
FIG. 5 illustrates a time-frequency resource grid of an OFDM communication system.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

Figure 6:
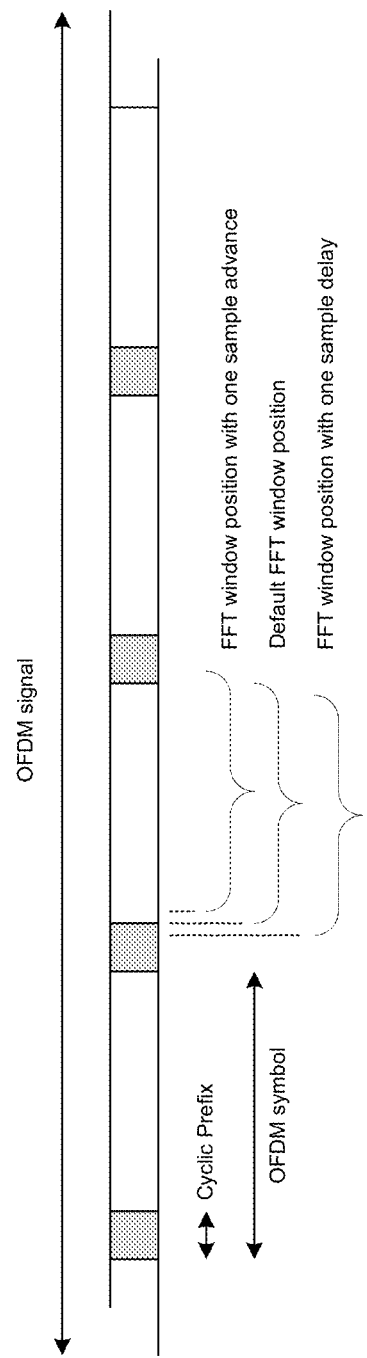
FIG. 6 illustrates the different FFT window timing positions according to the aspects of the present invention.

According to an aspect of the present invention, at the receiver when converting a time domain OFDM symbol to frequency domain, the FFT may be performed at three different timing positions: one default FFT window position based on the estimated timing for the OFDM symbol boundary, a second FFT window position with one sample advance relative to the default position and a third FFT window position with one sample delay relative to the default FFT window position. The three different window positions are illustrated in FIG. 6. In frequency domain, the FFT output for all three positions may be stored in separate buffers. Next the Least Squares (LS) channel estimation may be performed for the RS REs based on the known modulation sequence and the estimated channel for each of the three buffers is saved in another set of three separate buffers.

Figure 7:
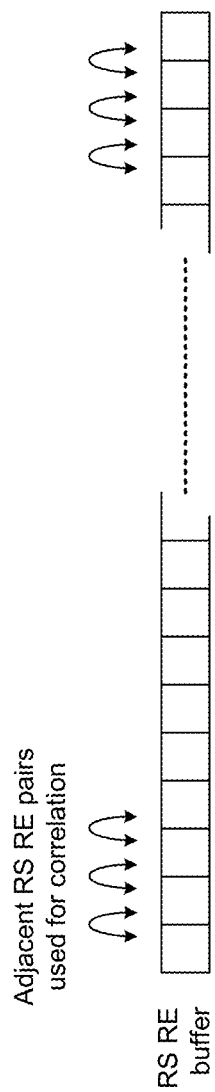
FIG. 7 illustrates the average phase difference computation according to the aspects of the present invention.

According to another aspect of the present invention, the average phase difference between two adjacent RS REs may be estimated by computing the angle of the average correlation between the adjacent RS REs over the entire frequency domain OFDM symbol as illustrated in FIG. 7. Denoting the channel estimate in the buffer corresponding to default position as $\hat{h}_{k,0}$ for k=0 to N−1, the average phase difference between adjacent RS REs may be computed as $$\theta_0 = \measuredangle \left( \frac{1}{N-1} \sum_{k=0}^{N-2} \hat{h}_{k,0} \hat{h}_{k+1,0}^* \right) \qquad (1)$$

where the symbol $\measuredangle(\cdot)$ denotes the angle of its argument, the superscript $(\ )^*$ denotes complex conjugate and the second suffix "0" after the comma refers to the default timing position of the FFT window. Similarly, denoting the channel estimate in the buffer corresponding to one sample advance relative to the default position as $\hat{h}_{k,+1}$, the average phase difference between adjacent RS REs may be computed as $$\theta_{+1} = \measuredangle \left( \frac{1}{N-1} \sum_{k=0}^{N-2} \hat{h}_{k+1} \hat{h}_{k+1,+1}^* \right) \qquad (2)$$

where the second suffix "+1" after the comma refers to the one sample advance timing position of the FFT window. Similarly, denoting the channel estimate in the buffer corresponding to one sample delay relative to the default position $\hat{h}_{k,+1}$, the average phase difference between adjacent RS REs may be computed as $$\theta_{-1} = \angle\left(\frac{1}{N-1}\sum_{k=0}^{N-2}\hat{h}_{k,-1}\hat{h}_{k+1,-1}^{*}\right) \quad (2)$$

where the second suffix "−1" after the comma refers to the one sample delay timing position of the FFT window.

According to another aspect of the present invention, the FFT window position corresponding to the channel estimation output for which the phase difference between the two adjacent RS REs is the smallest may be considered as the optimum timing FFT window position under prevailing conditions. The channel estimate corresponding to the optimum FFT window position may be used for channel estimation for non-RS REs such as for Data symbol REs using the RS REs with conventional methods such as MMSE followed by equalization and further processing in the receiver.

Although the invention is described with an example of three different FFT window positions, it may be applied using higher number of FFT window positions. The number of FFT window positions considered may be a function of the reliability of the estimated default FFT window timing position.

According to another aspect of the present invention, the estimated phase difference $\theta_0$ may be compared against the phase difference corresponding to window positions having larger timing offsets relative to a default window position to handle larger timing position errors.

According to another aspect of the present invention, the update for the default FFT window timing position may be performed on a periodic basis based on the optimum FFT window position determined over a set of a last few OFDM symbols. For example, the update for the optimum FFT window timing position may be related to the air-interface structure. For example, In case of 3rd Generation Partnership Project (3GPP) Long Term Evolution (LTE) wireless communication system, the air interface comprises OFDM symbols and subframes where a group of consecutive OFDM symbols form a subframe of 1 ms duration. For this example, the update for the optimum FFT window timing position may be performed once per subframe (1 ms duration). The average of the optimum window positions determined according to the aspects of the present invention for all the OFDM symbols in one subframe may be used as the new default FFT window position for the next sub frame.

In an alternative method of the present invention, a single FFT window position and a single channel estimation buffer may be used. The phase difference $\theta_0$ between adjacent RS REs may be estimated by using correlation between adjacent RS REs in frequency domain for the default FFT window position as shown in EQ. (1). The linear phase shift that may be caused by a D sample FFT window position offset may be computed using properties of Fourier transforms as $e^{-jk\Delta f(DT_S)}$, where $T_s$ is duration of one sample, k is the subcarrier index, $\Delta f$ is the subcarrier spacing in Hertz and $j=\sqrt{-1}$. The phase difference between adjacent REs for this signal is given as follows:

$$\phi(D) = e^{-jk\Delta f(DT_S)} \times (e^{-j(k+1)\Delta f(DT_S)})^* = e^{j\Delta f(DT_S)} \quad (4)$$

Next the phase difference $\delta(1)$ between the estimated phase difference $\theta_0$ between adjacent RS REs based on correlation between adjacent RS REs in frequency domain for the default FFT window position and the phase difference $\phi(1)$ between adjacent RS REs may based on the linear phase shift corresponding to one sample FFT window position offset in a positive direction is computed as follows:

$$\delta = \theta_0 - \phi(1) \quad (5)$$

Similarly, the phase difference $\delta(-1)$ between $\theta_0$ and the phase difference $\phi(-1)$ between adjacent RS REs based on the linear phase shift corresponding to one sample FFT window position offset in a negative direction is computed as follows:

$$\delta(1) = \theta_0 \phi(1) \quad (5)$$

Furthermore, by definition $$\delta(0) = \theta_0 \quad (6)$$

Finally, the absolute value of all the $\delta(\cdot)$ values is taken and the minimum is determined. The FFT window position corresponding to the minimum absolute $\delta(\cdot)$ values is considered to be the optimum position.

According to another aspect of the present invention, the estimated phase difference $\theta_0$ may be compared against the phase difference caused by linear phase shifts corresponding to window positions having larger timing offsets relative to a default window position to handle larger timing position errors. The alternative method has the advantage of requiring FFT operation only once per OFDM symbol compared to the first described method where the required number of FFT is equal to the number of FFT window positions considered.

Some channel estimation techniques may use filtering along time axis for improved channel estimation under certain conditions by using more than one OFDM symbol. According to an aspect of the present invention, if time axis filtering is used, the FFT window position for all the OFDM symbols used for time axis filtering may use the same FFT window position. Referring to FIG. 6, if the channel estimation for OFDM symbol m is performed using one specific optimum FFT window position and if the channel estimation for OFDM symbol m+1 is performed using the same FFT window position, then channel estimates from the OFDM symbol m and OFDM symbol m+1 may be used jointly to obtain an improved channel estimate for both the OFDM symbols. For example, the channel estimates for each RE in OFDM symbol m and OFDM symbol m+1 may be averaged. Averaging is a type of filtering and since it may be performed over two or more OFDM symbols it is referred to as time axis filtering. If the optimum FFT window position for the OFDM symbol m and the OFDM symbol m+1 are not the same, then the time axis filtering may not be done by filtering these two OFDM symbols.

Figure 8:
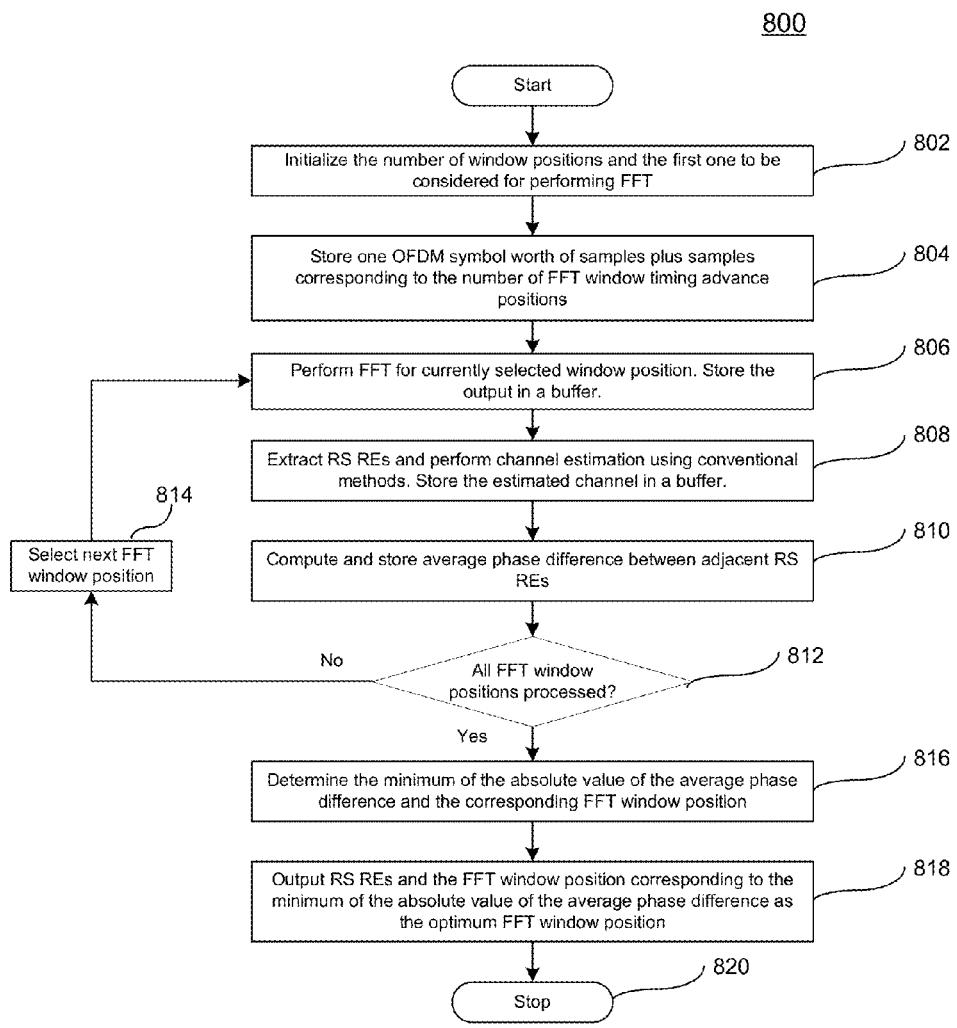
FIG. 8 illustrates an example flow diagram for processing steps according to aspects of the present invention.

The flow diagram 800 contained in FIG. 8 illustrates an exemplary robust channel estimation method according to various aspects of the present invention. At processing stage 802, initialization is performed for the number of different FFT window positions and the first FFT window position to be considered for performing FFT. At processing stage 804, one OFDM symbol worth of samples plus additional samples corresponding to the number of FFT window timing advance positions are stored. At processing stage 806, FFT for the currently selected window position is performed and the output is stored in a buffer. At processing stage 808, the RS REs from the stored buffer are extracted and channel estimation is performed using these RS REs with conventional methods such as LS. The estimated channel is stored in a buffer. At processing stage 810, the average phase difference between the adjacent RS REs is computed, for example using EQ. (1) or equivalent equation corresponding to the different FFT window positions being considered. The computed average phase difference is saved in another buffer. At processing stage 812, a determination is made whether the average phase difference for all the FFT window positions has been computed. If there are FFT window positions remaining to be processed, the next FFT window position to be processed is selected at processing stage 814 and then the processing returns to processing stage 806. If there are no more FFT window positions remaining to be processed, the processing continues at processing stage 816, where the minimum of the absolute value of all the stored average phase difference values and its corresponding FFT window position are determined. The FFT window position with minimum of the absolute value of the average phase difference is determined to be the optimum FFT window position. At processing stage 818 the RS REs corresponding to the optimum FFT window position and the FFT window position offset are output for the next stage of processing. The processing may terminate at stage 820.

Figure 9:
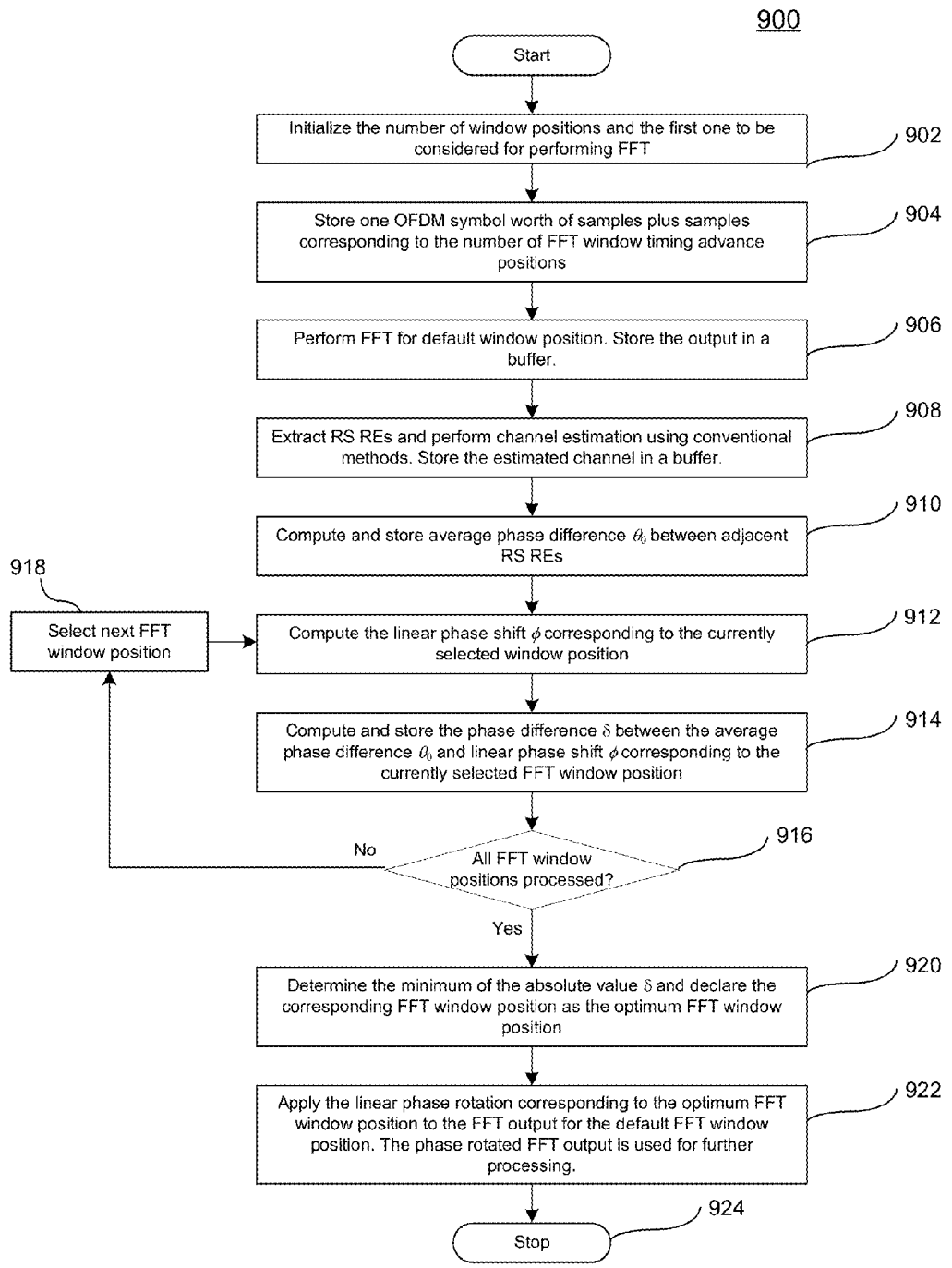
FIG. 9 illustrates an example flow diagram for processing steps according to aspects of the alternative method of the present invention.

The flow diagram 900 contained in FIG. 9 illustrates an alternative exemplary robust channel estimation method according to various aspects of the present invention. At processing stage 902, initialization is performed for the number of different FFT window positions and the first FFT window position to be considered for performing FFT. At processing stage 904, one OFDM symbol worth of samples plus additional samples corresponding to the number of FFT window timing advance positions are stored. At processing stage 906, FFT for the default FFT window position is performed and the output is stored in a buffer. At processing stage 908, the RS REs from the stored buffer are extracted and channel estimation is performed using these RS REs with conventional methods such as LS. The estimated channel is stored in a buffer. At processing stage 910, the average phase difference between the adjacent RS REs is computed, for example using EQ. (1) or equivalent equation corresponding to the different FFT window positions being considered. The computed average phase difference is saved in a buffer. At processing stage 912, a linear phase shift φ corresponding to the currently selected FFT window position is computed. At processing stage 914, the phase difference δ between the average phase difference $\theta_0$ of the default FFT window position and the linear phase shift φ corresponding to the currently selected FFT window position is computed. The computed phase difference δ is stored in a buffer. At processing stage 916, a determination is made whether the all the FFT window positions have been processed. If there are FFT window positions remaining to be processed, the next FFT window position to be processed is selected at processing stage 918 and then the processing returns to processing stage 912. If there are no more FFT window positions remaining to be processed, the processing continues at processing stage 920, where the minimum of the absolute value of all the stored phase difference values δ is determined and the FFT window position corresponding to the minimum is declared to be the optimum FFT window position. At processing stage 922, the liner phase shift rotation corresponding to the optimum FFT window position to the FFT output of the default FFT window position is applied. The phase rotated FFT output is used for the next stage of processing in receiver. The processing may terminate at stage 924.

By way of example only, the above-described method may be implemented in a receiver, e.g., a user device such as a wireless mobile station (MS) 12 as shown in FIG. 1.

Figure 10:
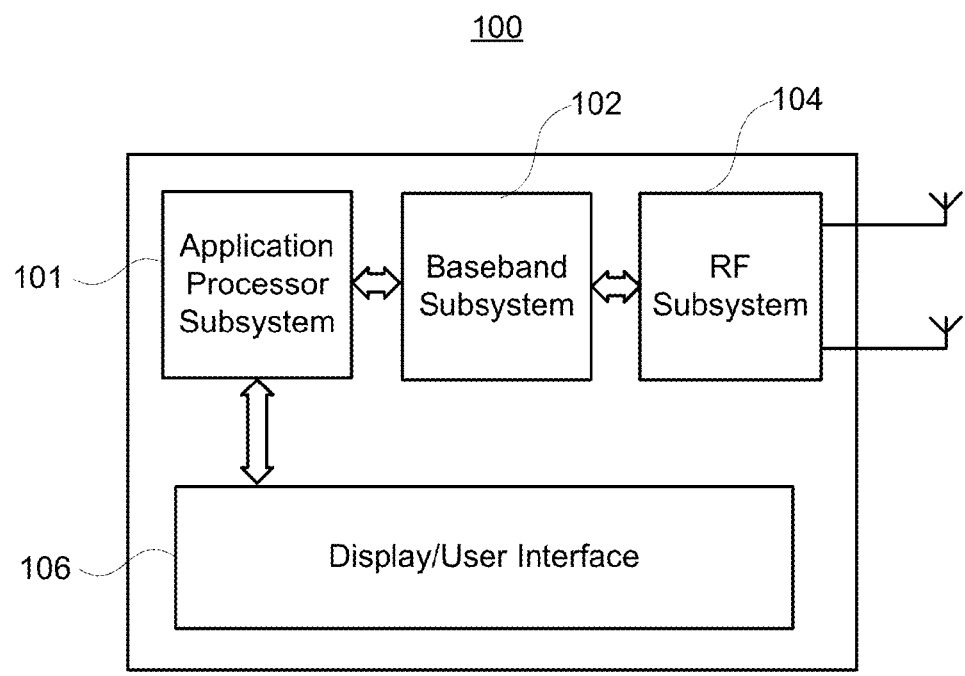
FIG. 10 illustrates a wireless mobile station diagram, which may be employed with aspects of the invention described herein.

As shown in FIG. 10, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 11:
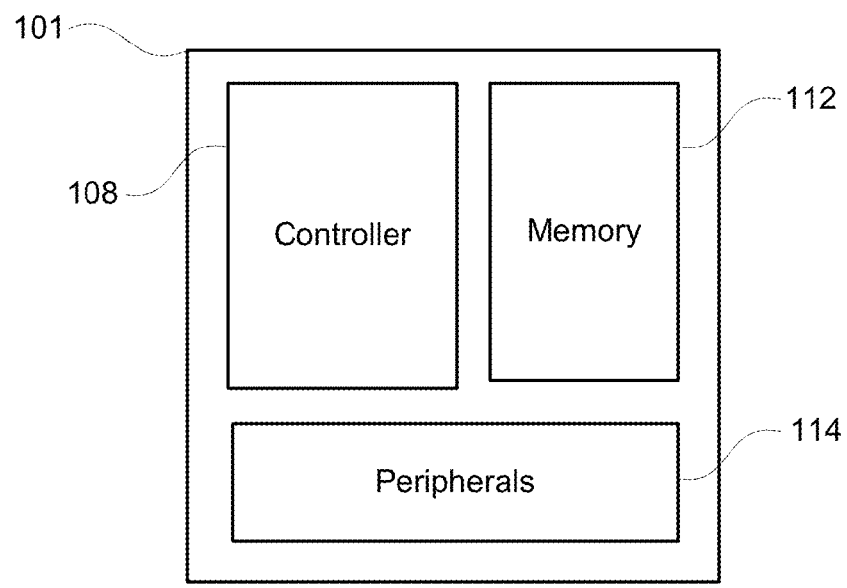
FIG. 11 illustrates an application processor subsystem for a wireless mobile station, which may be employed with aspects of the invention described herein.
Figure 12:
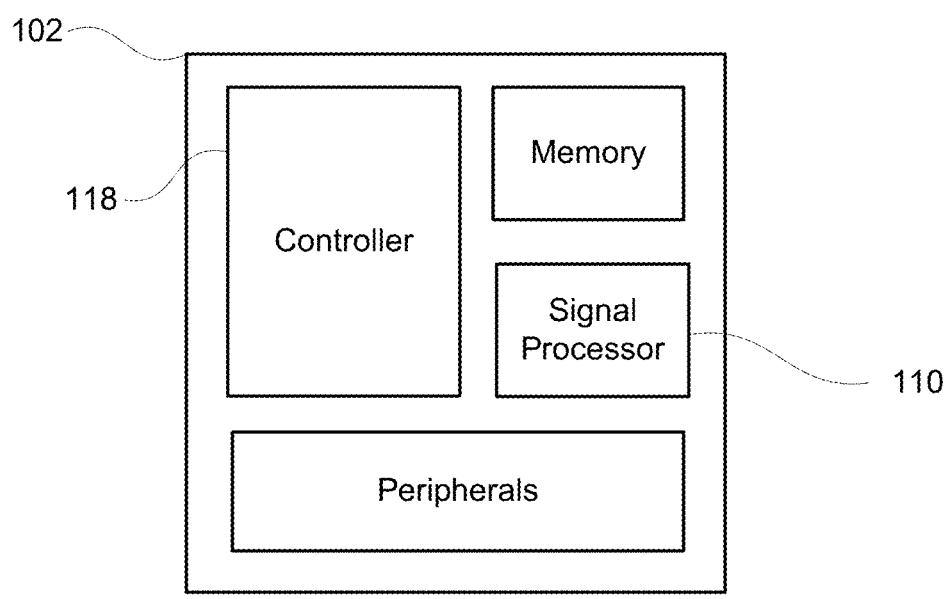
FIG. 12 illustrates a baseband subsystem for a wireless mobile station, which may be employed with aspects of the invention described herein.
Figure 13:
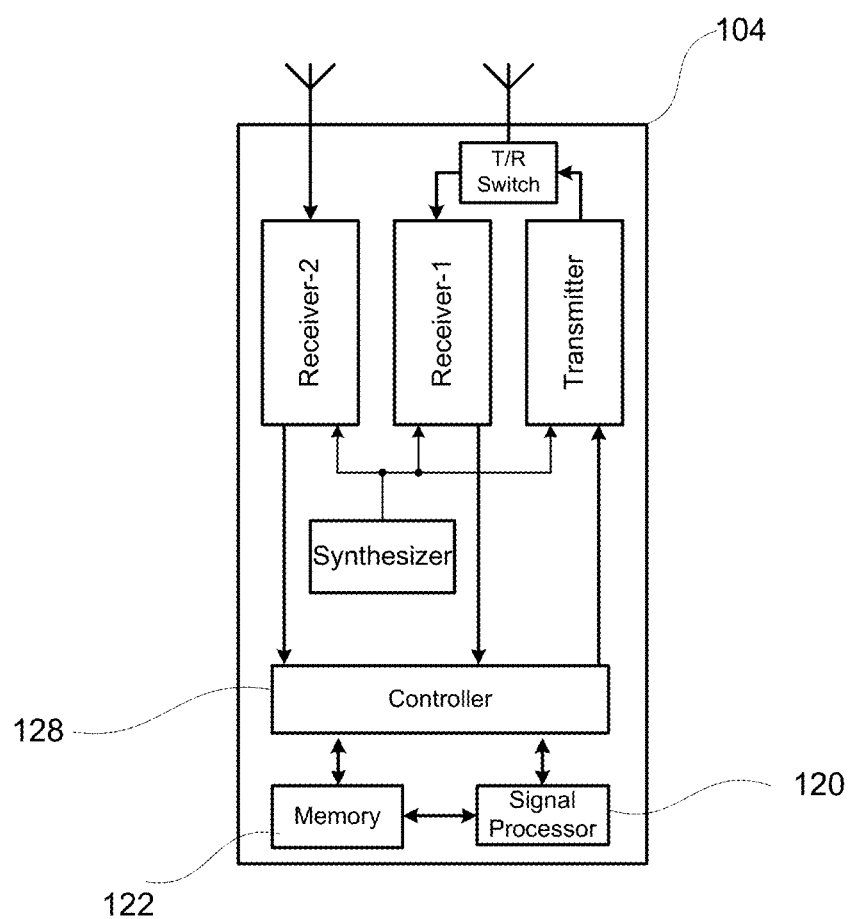
FIG. 13 illustrates an RF subsystem for a wireless mobile station, which may be employed with aspects of the invention described herein.

The application processor subsystem 101 as shown in FIG. 11 may include a controller 108 such as a microcontroller, another processor or other circuitry. The baseband subsystem 102 as shown in FIG. 12 may include a controller 118 such as a microcontroller or other processor. The RF subsystem 104 as shown in FIG. 13 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present invention.

Peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem. In another alternative, aspects of the present invention may also be implemented as a combination of firmware and hardware of the application processor subsystem 101 and/or the baseband subsystem 102. For instance, a signal processing entity of any or all of the FIG. 12 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the invention may include smartphones, tablets, laptops, gaming consoles, cameras, video camcorders, TV, car entertainment systems, etc.

Although aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for channel estimation in a wireless communication system, the method comprising:
controlling, by a processing device, for each of a plurality of window positions for each of at least one orthogonal frequency division multiplexing (OFDM) symbol:
performing a Fast Fourier Transform (FFT) at a given window position of a given OFDM symbol;

determining a channel estimate for reference symbol (RS) reference elements (REs) of the given OFDM symbol for the given window position, based on a predetermined modulation sequence; and determining an average phase difference θ between two adjacent RS REs of the RS REs for the channel estimate for the given window position, by computing an angle of average correlation between the two adjacent RS REs over an entire frequency domain of the given OFDM symbol; and controlling, by the processing device, determining, as an optimum window position for the channel estimation, the window position of the plurality of window positions for the given OFDM symbol for which an absolute value of the average phase difference is smallest.

2. The method of claim 1, wherein the plurality of window positions includes three window positions.

3. The method of claim 1, wherein the plurality of window positions includes a first window position based on an estimated timing for a boundary of the given OFDM symbol, at least one second window position advanced relative to the first window position, at least one third window position delayed relative to the first window position.

4. The method of claim 1, wherein the channel estimate is by Least Squares (LS) channel estimation.

5. The method of claim 1,
wherein the average phase difference θ between the two adjacent RS REs for the channel estimate for the given window position i is computed as $$\theta_i = \angle\left(\frac{1}{N-1}\sum_{k=0}^{N-2} \hat{h}_{k,i}\hat{h}_{k+1,i}^*\right)$$

wherein the channel estimate corresponding to the given window position i is $\hat{h}_{k,i}$ for k=0 to N−1, the superscript ( )* denotes complex conjugate and N is a number of used subcarriers in the given OFDM symbol.

6. The method of claim 1, further comprising:
controlling, by the processing device, performing channel estimation for non-RS REs of the given OFDM symbol using the channel estimate corresponding to the optimum window position.

7. The method of claim 6,
wherein the non-RS REs include data symbol REs and the channel estimation for the non-RS REs is performed by minimum mean square error (MMSE) estimation followed by equalization.

8. The method of claim 1,
wherein the at least one OFDM symbol includes a plurality of OFMD symbols,
the method further comprising:
controlling, by the processing device, periodically, determining an updated optimum window position, based on the optimum window positions respectively determined for a predetermined last plurality of the plurality of OFDM symbols.

9. The method of claim 1,
wherein the at least one OFDM symbol includes a plurality of OFMD symbols,
the method further comprising:
controlling, by the processing device, when the optimum window positions for the channel estimates respectively for the plurality of OFDM symbols are the same, combining the respective channel estimates to obtain an overall channel estimate for the plurality of OFDMs.

10. The method of claim 9,
wherein the combining the respective channel estimates includes averaging the respective channel estimates to obtain an average channel estimate as the overall channel estimate.

11. A method for channel estimation in a wireless communication system, the method comprising:
controlling, by a processing device, for a single window position of a plurality of window positions for each of at least one orthogonal frequency division multiplexing (OFDM) symbol,
performing a Fast Fourier Transform (FFT) for a given OFDM symbol;
determining a channel estimate for reference symbol (RS) reference elements (REs) of the given OFDM symbol for the single window position, based on a predetermined modulation sequence; and
determining an average phase difference θ between two adjacent RS REs of the RS REs for the channel estimate for the single window position of the given OFDM symbol, by computing an angle of average correlation between the two adjacent RS REs over an entire frequency domain of the given OFDM symbol;
controlling, by the processing device, for each window position of the plurality of window positions other than the single window position for each of the at least one OFDM symbol,
determining a linear phase shift φ between two adjacent RS REs of the RS REs corresponding to a given window position of the given OFDM symbol, and
determining a phase difference δ between the average phase difference θ for the single window position of the given OFDM symbol and the linear phase shift φ corresponding to the given window position of the given OFDM symbol; and
controlling, by the processing device, for each of the at least one OFDM symbol, determining, as an optimum window position for the channel estimation, the window position of the plurality of window positions of the given OFDM symbol for which an absolute value of the phase difference δ is smallest.

12. The method of claim 11,
wherein the average phase difference θ between the two adjacent RS REs for the channel estimate for the window position is computed as $$\theta = \angle\left(\frac{1}{N-1}\sum_{k=0}^{N-2} \hat{h}_k \hat{h}_{k+1}^*\right)$$

wherein the channel estimate corresponding to the window position is $\hat{h}_k$ for k=0 to N−1, the superscript ( )* denotes complex conjugate and N is a number of used subcarriers in the given OFDM symbol.

13. The method of claim 11,
wherein the linear phase shift φ is a phase difference between two adjacent RS REs of the RS REs for the given window position of the given OFDM symbol computed as $e^{-jk\Delta f(DT_S)}$, where D is a number of sample offset of the given window position of the given OFDM symbol from the single window position of the given OFDM symbol, $T_s$ is duration of one sample, k is a subcarrier index, Δf is subcarrier spacing in Hertz, and $j=\sqrt{-1}$.

14. The method of claim 11,
wherein the at least one OFDM symbol includes a plurality of OFMD symbols,
the method further comprising:
controlling, by the processing device, when the optimum window positions for the channel estimates respectively for the plurality of OFDM symbols are the same, combining the respective channel estimates to obtain an overall channel estimate for the plurality of OFDMs.

15. The method of claim 14,
wherein the combining the respective channel estimates includes averaging the respective channel estimates to obtain an average channel estimate as the overall channel estimate.

16. The method of claim 11, wherein the single window position is based on an estimated time for a boundary of the given OFDM symbol.

17. An apparatus for channel estimation in a wireless communication system, the apparatus comprising:
circuitry configured to control, for each of a plurality of window positions for each of at least one orthogonal frequency division multiplexing (OFDM) symbol:
performing a Fast Fourier Transform (FFT) at a given window position of a given OFDM symbol;
determining a channel estimate for reference symbol (RS) reference elements (REs) of the given OFDM symbol for the given window position, based on a predetermined modulation sequence; and
determining an average phase difference θ between two adjacent RS REs of the RS REs for the channel estimate for the given window position, by computing an angle of average correlation between the two adjacent RS REs over an entire frequency domain of the given OFDM symbol;
wherein the circuitry is configured to control determining, as an optimum window position for the channel estimation, the window position of the plurality of window positions for the given OFDM symbol for which an absolute value of the average phase difference is smallest.

18. The apparatus of claim 17, wherein the plurality of window positions includes a first window position based on an estimated timing for a boundary of the given OFDM symbol, at least one second window position advanced relative to the first window position, at least one third window position delayed relative to the first window position.

19. An apparatus for channel estimation in a wireless communication system, the apparatus comprising:
circuitry configured to control, for a single window position of a plurality of window positions for each of at least one orthogonal frequency division multiplexing (OFDM) symbol:
performing a Fast Fourier Transform (FFT) for a given OFDM symbol;
determining a channel estimate for reference symbol (RS) reference elements (REs) of the given OFDM symbol for the single window position, based on a predetermined modulation sequence; and
determining an average phase difference θ between two adjacent RS REs of the RS REs for the channel estimate for the single window position of the given OFDM symbol, by computing an angle of average correlation between the two adjacent RS REs over an entire frequency domain of the given OFDM symbol;
wherein the circuitry is configured to control, for each window position of the plurality of window positions other than the single window position for each of the at least one OFDM symbol:
determining a linear phase shift φ between two adjacent RS REs of the RS REs corresponding to a given window position of the given OFDM symbol, and
determining a phase difference δ between the average phase difference θ for the single window position of the given OFDM symbol and the linear phase shift φ corresponding to the given window position of the given OFDM symbol;
wherein the circuitry is configured to control, for each of the at least one OFDM symbol, determining, as an optimum window position for the channel estimation, the window position of the plurality of window positions of the given OFDM symbol for which an absolute value of the phase difference δ is smallest.

20. The apparatus of claim 19, wherein the single window position is based on an estimated time for a boundary of the given OFDM symbol.

21. A wireless communication device comprising:
a receiver configured to receive an orthogonal frequency division multiplexing (OFDM) signal; and
a processing device configured to control, for each of a plurality of window positions for each of at least one orthogonal frequency division multiplexing (OFDM) symbol of the signal:
performing a Fast Fourier Transform (FFT) at a given window position of a given OFDM symbol;
determining a channel estimate for reference symbol (RS) reference elements (REs) of the given OFDM symbol for the given window position, based on a predetermined modulation sequence; and
determining an average phase difference θ between two adjacent RS REs of the RS REs for the channel estimate for the given window position, by computing an angle of average correlation between the two adjacent RS REs over an entire frequency domain of the given OFDM symbol;
wherein the processing device is configured to control determining, as an optimum window position for the channel estimation, the window position of the plurality of window positions for the given OFDM symbol for which an absolute value of the average phase difference is smallest.

22. The device of claim 21, wherein the plurality of window positions includes a first window position based on an estimated timing for a boundary of the given OFDM symbol, at least one second window position advanced relative to the first window position, and at least one third window position delayed relative to the first window position.

23. A wireless communication device comprising:
a receiver configured to receive an orthogonal frequency division multiplexing (OFDM) signal; and
a processing device configured to control, for a single window position of a plurality of window positions for each of at least one orthogonal frequency division multiplexing (OFDM) symbol of the signal:
performing a Fast Fourier Transform (FFT) for a given OFDM symbol;
determining a channel estimate for reference symbol (RS) reference elements (REs) of the given OFDM symbol for the single window position, based on a predetermined modulation sequence; and determining an average phase difference θ between two adjacent RS REs of the RS REs for the channel estimate for the single window position of the given OFDM symbol, by computing an angle of average correlation between the two adjacent RS REs over an entire frequency domain of the given OFDM symbol;

wherein the processing device is configured to control, for each window position of the plurality of window positions other than the single window position for each of the at least one OFDM symbol:

determining a linear phase shift φ between two adjacent RS REs of the RS REs corresponding to a given window position of the given OFDM symbol, and determining a phase difference δ between the average phase difference θ for the single window position of the given OFDM symbol and the linear phase shift φ corresponding to the given window position of the given OFDM symbol;

wherein the processing device is configured to control, for each of the at least one OFDM symbol, determining, as an optimum window position for the channel estimation, the window position of the plurality of window positions of the given OFDM symbol for which an absolute value of the phase difference δ is smallest.

24. The device of claim 23, wherein the single window position is based on an estimated time for a boundary of the given OFDM symbol.

* * * * *